(12) United States Patent
Roesch (10) Patent No.: US 9,880,929 B2
(45) Date of Patent: Jan. 30, 2018

(54) SYSTEMS AND METHODS FOR GENERATING A UNIQUE DEVICE ID

(71) Applicant: SCHNEIDER ELECTRIC IT CORPORATION, West Kingston, RI (US)

(72) Inventor: James Richard Roesch, St. Charles, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 291 days.

(21) Appl. No.: 14/573,527

(22) Filed: Dec. 17, 2014

(65) Prior Publication Data

US 2016/0179663 A1   Jun. 23, 2016

(51) Int. Cl.

| G06F 15/16 | (2006.01) |
|---|---|
| G06F 12/02 | (2006.01) |
| H04L 29/12 | (2006.01) |
| H04L 9/08 | (2006.01) |
| H04L 12/40 | (2006.01) |
| G11C 7/10 | (2006.01) |

(Continued)

(52) U.S. Cl.
CPC ............ *G06F 12/0246* (2013.01); *G06F 7/58* (2013.01); *G09C 1/00* (2013.01); *G11C 7/1072* (2013.01); *H04L 9/0866* (2013.01); *H04L 12/40078* (2013.01); *H04L 61/2038* (2013.01); *H04L 61/2092* (2013.01); *G06F 2212/7208* (2013.01); *H04L 61/6027* (2013.01); *H04L 2012/40215* (2013.01)

(58) Field of Classification Search
None
See application file for complete search history.

(56) References Cited

U.S. PATENT DOCUMENTS

2009/0319799 A1* 12/2009 Carpenter ............... G06F 21/73
                                                                              713/189
2011/0300943 A1* 12/2011 Devine ............... H04L 29/1232
                                                                              463/42

(Continued)

FOREIGN PATENT DOCUMENTS

WO    2011018414 A2    2/2011

OTHER PUBLICATIONS

Extended European Search Report from corresponding European Application No. 15199790.5 dated May 23, 2016.

(Continued)

*Primary Examiner* — Glenford Madamba
(74) *Attorney, Agent, or Firm* — Lando & Anastasi, LLP (57) ABSTRACT

A device including a network interface, a memory, and at least one processor is provided. The memory may include a random access memory (RAM) and nonvolatile memory. The processor may be coupled to the memory and coupled to the network interface and configured to designate an uninitialized section of RAM, generate a network device identifier for the device using data from the uninitialized section of RAM, store the network device identifier in a nonvolatile memory, and assign the network device identifier to the device. The at least one processor may be further configured to generate the network device identifier using the data from the uninitialized section of RAM as a seed for a pseudorandom number generator.

20 Claims, 5 Drawing Sheets

(51) Int. Cl.
G06F 7/58 (2006.01)
G09C 1/00 (2006.01)

(56) References Cited

U.S. PATENT DOCUMENTS

| | | | | |
|---|---|---|---|---|
| 2012/0254958 | A1* | 10/2012 | Budampati | H04L 61/2038 726/6 |
| 2013/0282781 | A1* | 10/2013 | Park | G06F 7/588 708/250 |
| 2014/0040338 | A1* | 2/2014 | Van Der Sluis | H04L 9/0866 708/254 |
| 2015/0012737 | A1* | 1/2015 | Newell | G06F 21/575 713/2 |
| 2015/0163211 | A1* | 6/2015 | Chellappa | H04L 63/08 713/155 |

OTHER PUBLICATIONS

Holcomb D E et al: "Power-up SRAM State as an Identifying Fingerprint and Source of True Random Numbers", IEEE Transactions on Computers, IEEE Service Center, Los Alamitos, CA, US, uol. 57, No. 11, Nov. 1, 2008 (Nov. 1, 2008 ), pp. 1-14, XP007918251, ISSN: 0018-9340.

* cited by examiner

SYSTEMS AND METHODS FOR GENERATING A UNIQUE DEVICE ID

BACKGROUND

Technical Field

The technical field relates generally to devices in networks and, more specifically, to generation of unique device identification information for devices in a network.

Background Discussion

Networking standards that employ a shared bus topology have a wide installed base in industrial applications. These networking standards include MODBUS, CAN, $I^2C$ and many radio based networks such as WLAN, ZigBee and Bluetooth. There are sundry reasons for the success of these networks, and some include ease of implementation, low cost of materials and robust performance in noisy, industrial settings.

A network generally uses a bus as known in the art to allow microcontrollers and devices to communicate with each other. A network may connect multiple nodes. A node in a network can range from a simple I/O device to an embedded computer with an interface, display, and sophisticated software. The node may also be a gateway allowing a standard computer to communicate over a USB or Ethernet port to the devices on a network.

SUMMARY

According to various aspects and embodiments, a device and method including a network are provided. The present invention improves upon the current method for generating a unique device identifier for each device in a network. More specifically, at least some embodiments of the present invention relate to generating a device identifier with a randomly generated number using static random-access memory (SRAM) as a seed for a pseudorandom number generator (PRNG).

According to some aspects, a device including a network interface, a memory, and at least one processor is provided. The memory may include a random access memory (RAM) and nonvolatile memory. The processor may be coupled to the memory and coupled to the network interface and configured to designate an uninitialized section of the RAM, generate a network device identifier for the device using data from the uninitialized section of RAM, store the network device identifier in a nonvolatile memory, and assign the network device identifier to the device.

In the device, the at least one processor may be further configured to set a device identifier flag in response to assigning the network device identifier to the device. The at least one processor may be further configured to generate the network device identifier using the data from the uninitialized section of RAM as a seed for a pseudorandom number generator. The at least one processor may be further configured to generate the network device identifier using a true random number generator.

In the device, the at least one processor may be further configured to automatically generate a device address for the device, receive a message indicating a second device has the device address, compare the device identifier of the device to a second device identifier of the second device, and assign the device address to the device in response to comparing the device identifier to the second device identifier.

According to some embodiments, the network interface may be configured to couple to a controller area network. The nonvolatile memory may be electrically erasable programmable read-only memory. The RAM may be static random access memory.

According to various embodiments, a method for generating a device identifier is provided. The method may include acts of designating a section of uninitialized random access memory (RAM), generating the device identifier for a device on a network using data from the section of uninitialized RAM, storing the device identifier in a nonvolatile memory, and assigning the device identifier to the device.

The method may further include an act of setting a device identifier flag in response to assigning the device identifier to the device. In addition, generating the device identifier may include generating the device identifier using the data as a seed for a pseudorandom number generator. Further, generating the device identifier may include generating the device identifier using a true random number generator. The device identifier in the nonvolatile memory may include storing the device identifier in electrically erasable programmable read-only memory. Additionally, generating the device identifier for the device on the network may include generating the device identifier for the device on a controller area network.

In some embodiments, the method includes acts of automatically generating a device address for the device, receiving a message indicating a second device has the device address, comparing the device identifier of the device to a second device identifier of the second device, and assigning the device address to the device in response to comparing the device identifier to the second device identifier. Further, designating the section of RAM may include designating the section of static random access memory.

According to some aspects, a non-transitory computer readable medium having stored thereon sequences of instruction for generating a device identifier is provided. The sequences of instructions may include instructions that will cause at least one processor to designate a section of uninitialized random access memory (RAM), generate the device identifier for a device on a network, wherein the device identifier is generated using data from the section of uninitialized RAM, store the device identifier in a nonvolatile memory, and assign the device identifier to the device.

According to some embodiments, the sequences of instruction include further instructions that will cause the at least one processor to automatically generate a device address for the device, receive a message indicating a second device has the device address, compare the device identifier of the device to a second device identifier of the second device, and assign the device address to the device in response to comparing the device identifier to the second device identifier.

According to some embodiments, the sequences of instruction may include further instructions that will cause the at least one processor to set a device identifier flag in response to assigning the device identifier to the device. Additionally, the sequence of instruction may include further instructions that will cause the at least one processor to use the data from the section of uninitialized RAM as a seed for a pseudorandom number generator.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example or embodiment may be combined with any other example or embodiment. References to "an example," "an embodiment," "some examples," "some embodiments," "an alternate example," "various embodiments," "one example," "at least one embodiment," "this and other examples" or the like are not necessarily mutually exclusive and are intended to indicate that a particular feature, structure, or characteristic described in connection with the example or embodiment may be included in at least one example or embodiment. The appearances of such terms herein are not necessarily all referring to the same example or embodiment. Furthermore, in the event of inconsistent usages of terms between this document and documents incorporated herein by reference, the term usage in the incorporated references is supplementary to that of this document; for irreconcilable inconsistencies, the term usage in this document controls.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

According to some examples, devices coupled to a bus use a protocol stack for intra device communication, and the protocol stack includes address generation and device identification functionality. To implement these two features, each device has a value or identifier (e.g., a seven byte value) to uniquely identify the device on a network. Currently, according to some examples, a device's identifier is generated as a seven byte value using a device's twelve character serial number with a compression algorithm. However, when manufacturers change serial number formats, the compression algorithm will typically need to change as well, and the same algorithm may not be usable with different devices. Further, in many devices, entering the product serial number is a manual process, so when a technician replaces a controller in a device, the serial number has to be manually entered correctly. If a device is replaced and a technician enters a duplicate serial number or a non-existent serial number, the new device may not operate as intended. There exists a need for a way to easily set a unique device identifier without a risk of error.

At least some aspects and embodiments disclosed herein provide processes and apparatus by which a device in a network may automatically generate and assign a device identifier. One aspect of the present invention relates to the use of memory (e.g., SRAM) and a random number generator to create a random number to be used as a device identifier for devices in a network, such as a controller area network (CAN). Network devices used in industrial applications and in data centers, including cooling and power distribution devices and sensors are often implemented using lower cost controllers that are not equipped with a true random number generator (TRNG) that can be used to generate an identifier. These lower cost controllers often have a pseudorandom number generator (PRNG). PRNGs typically require a good seed to prevent a same sequence of values from being generated in different devices.

According to one aspect, in a network device, a small section of uninitialized SRAM is used as a seed for a PRNG to develop a unique identifier for the network device. The section of uninitialized SRAM may also be used as a pool for the output of the PRNG to select a seven byte device identifier. Using the SRAM in this manner makes it possible to generate a unique device identifier in devices that lack a TRNG. Since the device identifier is automatically created by a network device (e.g., in a controller of the network device), there is no dependency on a serial number whose format is set at creation in a factory, and no user intervention is required.

In embodiments of networks that use SRAM with a PRNG to create a device identifier, there is a slim likelihood that two devices are assigned the same device identifier. The probability p(m) of this occurring, which depends on the number of devices in network, is shown in equation 1.

$$p(m) = 1 - \left(\frac{n^r - 1}{n^r}\right)^{\frac{m(m-1)}{2}} \quad \text{Equation 1}$$

In Equation 1, n is the number of values in each byte of a Device ID, r is the number of bytes in the Device ID, and m is the number of devices in the network. As an example, the device ID may take up 256 values (0x00 to 0xFF) and 7 bytes. If a network has, for example, a hundred devices, Equation 2 may be used to determine the probability p(m).

$$p(m) = 1 - \left(\frac{256^7 - 1}{256^7}\right)^{\frac{100(100-1)}{2}} = 6.8695 \times 10^{-14} \quad \text{Equation 2}$$

As shown in Equation 2, the probability of any device in a network of 100 devices having the same number is very low. The probability would be less (practically negligible) with other networks, such as networks that only include 16 devices.

Example Network

Figure 1:
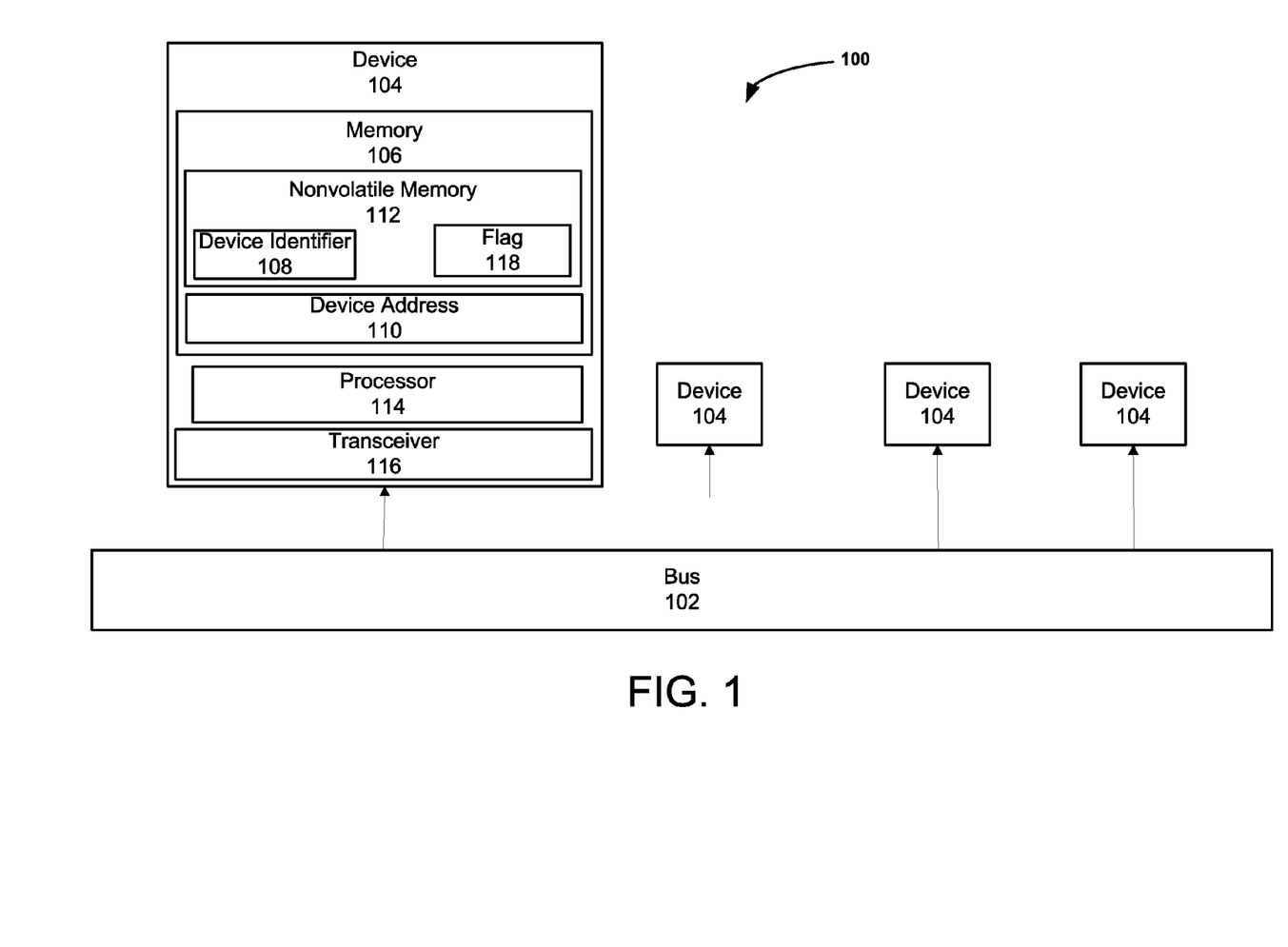
FIG. 1 is a block diagram of an example network, according to one embodiment.

FIG. 1 shows an example configuration of a system 100 of networked devices 104. The network may be implemented using a network topology such as a CAN network, however, other types of networks both wireless and wired may be used in embodiments of the invention. According to some aspects, the devices 104 may be master devices or slave devices that can utilize various communication protocols for intra-device communication via, for example, the bus 102. In some embodiments the devices 104 may include cooling devices, power distribution devices, industrial controllers or any other types of devices. One or more of the devices may act as a management device and monitor and control one or more of the other devices 104 over the bus 102. Each of devices 104 includes a memory 106, a processor 114, and a transceiver 116.

The memory 106 may include a device address 110 and a nonvolatile memory 112. The nonvolatile memory 112 may include a device identifier 108 and a flag 118 to indicate whether the device has a valid device identifier. According to one embodiment, the nonvolatile memory 112 may be an electrically erasable programmable read-only memory (EEPROM), flash memory, ferroelectric RAM (F-RAM), magnetoresistive RAM (MRAM), mark ROM (MROM), or any other type of nonvolatile memory. If the device identifier 108 is not valid, depending on whether the device has a TRNG or not, the device may create a new device identifier 108. According to some aspects, the memory 104 is an SRAM that is used to create the device identifier 108. According to some examples, at least part of the memory 106 may be writable and volatile. The memory 106 may be configured to contain, upon powering up, partially random memory content that may be used to generate the device identifier 108.

The processor 114 may be configured to run a PRNG and use a section of uninitialized memory (e.g., SRAM) as a seed. The processor 114 may also communicate with other devices 104 on the bus via the transceiver 116. According to some implementations, the transceiver 116 may be configured to send and receive information from other devices on the bus 102 as well as external devices. The transceiver includes a network interface which is configured to couple to a wired network or acts as a wireless transceiver in a wireless network. According to one embodiment, a device 104 may be included in a cooling system, a general purpose computer system, or a specialized computer system.

Computer System

As discussed above with regard to FIG. 1, various aspects and functions described herein including the devices in the network may be included as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 2:
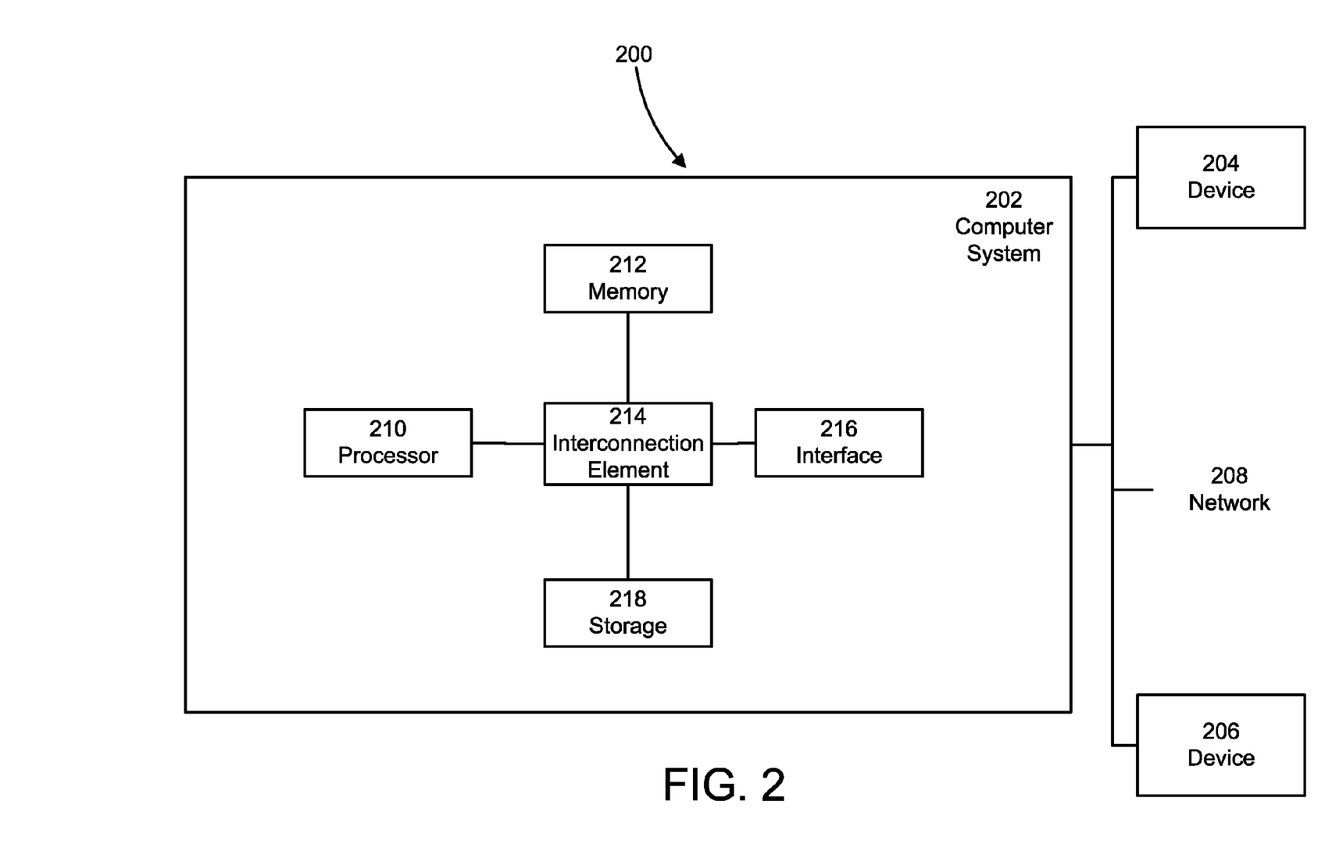
FIG. 2 is a block diagram of an example computer system, used in one embodiment.

Referring to FIG. 2, there is illustrated a block diagram of a distributed computer system 200, in which various aspects and functions are practiced. As shown, the distributed computer system 200 includes one or more computer systems that exchange information. More specifically, the distributed computer system 200 includes computer systems/devices 202, 204 and 206. As shown, the computer systems/devices 202, 204 and 206 are interconnected by, and may exchange data through, a communication network 208. The network 208 may include any communication network through which computer systems may exchange data. To exchange data using the network 208, the computer systems/devices 202, 204 and 206 and the network 208 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 202, 204 and 206 may transmit data via the network 208 using a variety of security measures including, for example, TLS, SSL or VPN. While the distributed computer system 200 illustrates three networked computer systems, the distributed computer system 200 is not so limited and may include any number of computer systems and computing devices, networked using any medium and communication protocol.

As illustrated in FIG. 2, the computer system 202 includes a processor 210, a memory 212, an interconnection element 214, an interface 216 and data storage element 218. To implement at least some of the aspects, functions and processes disclosed herein, the processor 210 performs a series of instructions that result in manipulated data. The processor 210 may be any type of processor, multiprocessor or controller. Some example processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 210 is connected to other system components, including one or more memory devices 212, by the interconnection element 214.

The memory 212 stores programs and data during operation of the computer system 202. Thus, the memory 212 may be a relatively high performance, volatile, random access memory such as a dynamic random access memory ("DRAM") or static memory ("SRAM"). However, the memory 212 may include any device for storing data, such as a disk drive or other nonvolatile storage device. Various examples may organize the memory 212 into particularized and, in some cases, unique structures to perform the functions disclosed herein. These data structures may be sized and organized to store values for particular data and types of data.

Components of the computer system 202 are coupled by an interconnection element such as the interconnection element 214. The interconnection element 214 may include one or more physical busses, for example, busses between components that are integrated within a same machine, but may include any communication coupling between system elements including specialized or standard computing bus technologies such as IDE, SCSI, PCI and InfiniBand. The interconnection element 214 enables communications, such as data and instructions, to be exchanged between system components of the computer system 202.

The computer system 202 also includes one or more interface devices 216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 202 to exchange information and to communicate with external entities, such as users and other systems.

The data storage element 218 includes a computer readable and writeable nonvolatile, or non-transitory, data storage medium in which instructions are stored that define a program or other object that is executed by the processor 210. The data storage element 218 also may include information that is recorded, on or in, the medium, and that is processed by the processor 210 during execution of the program. More specifically, the information may be stored in one or more data structures specifically configured to conserve storage space or increase data exchange performance. The instructions may be persistently stored as encoded signals, and the instructions may cause the processor 210 to perform any of the functions described herein. The medium may, for example, be optical disk, magnetic disk or flash memory, among others. In operation, the processor 210 or some other controller causes data to be read from the nonvolatile recording medium into another memory, such as the memory 212, that allows for faster access to the information by the processor 210 than does the storage medium included in the data storage element 218. The memory may be located in the data storage element 218 or in the memory 212, however, the processor 210 manipulates the data within the memory, and then copies the data to the storage medium associated with the data storage element 218 after processing is completed. A variety of components may manage data movement between the storage medium and other memory elements and examples are not limited to particular data management components. Further, examples are not limited to a particular memory system or data storage system.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 202 may be a computer system including an operating system that manages at least a portion of the hardware elements included in the computer system 202. In some examples, a processor or controller, such as the processor 210, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Example Processes

Figure 3:
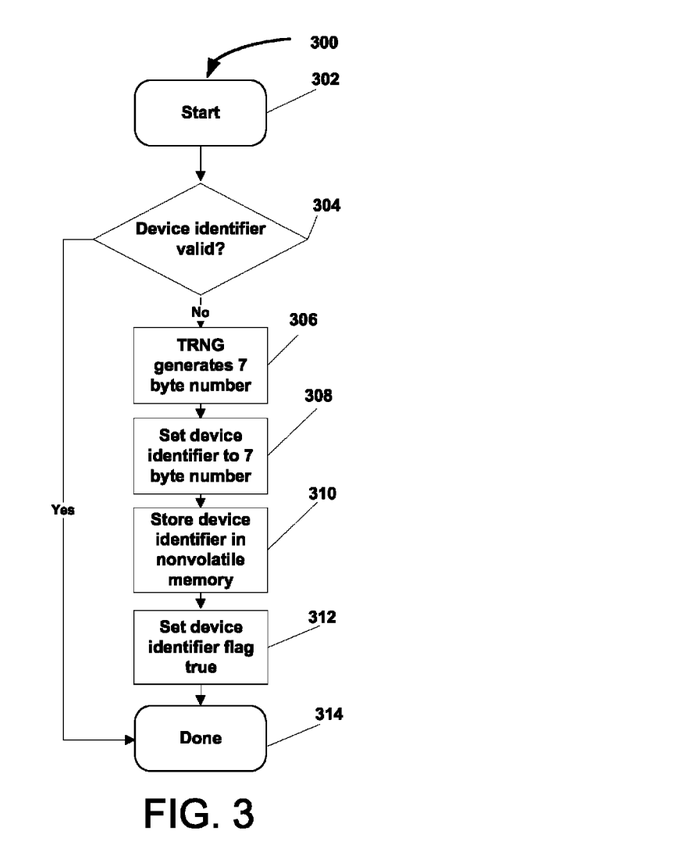
FIG. 3 is a flow diagram illustrating a process of generating a device identifier for a device with a true random number generator in accordance with one embodiment.

FIG. 3 illustrates a flow chart of a process 300 for generating and storing a device identifier using a device or controller that includes a TRNG according to one embodiment of the present invention. Process 300 begins at act 302. At act 304, the device checks to see if the current device identifier is valid. The device may check a flag in the nonvolatile memory that, when set to true, indicates that the device has a valid device identifier. If the flag indicates a valid device identifier, the device is already set and the method ends. If the device identifier flag is set to false, indicating that the device identifier is not set, at act 306, the TRNG generates a random 7 byte number that will be used as a device identifier. At act 308, the device identifier is set to the randomly generated 7 byte number. At act 310, the device identifier is stored in a nonvolatile memory (e.g., EEPROM). At act 312, the device identifier flag is set to true to indicate that a valid device identifier has been set.

Figure 4:
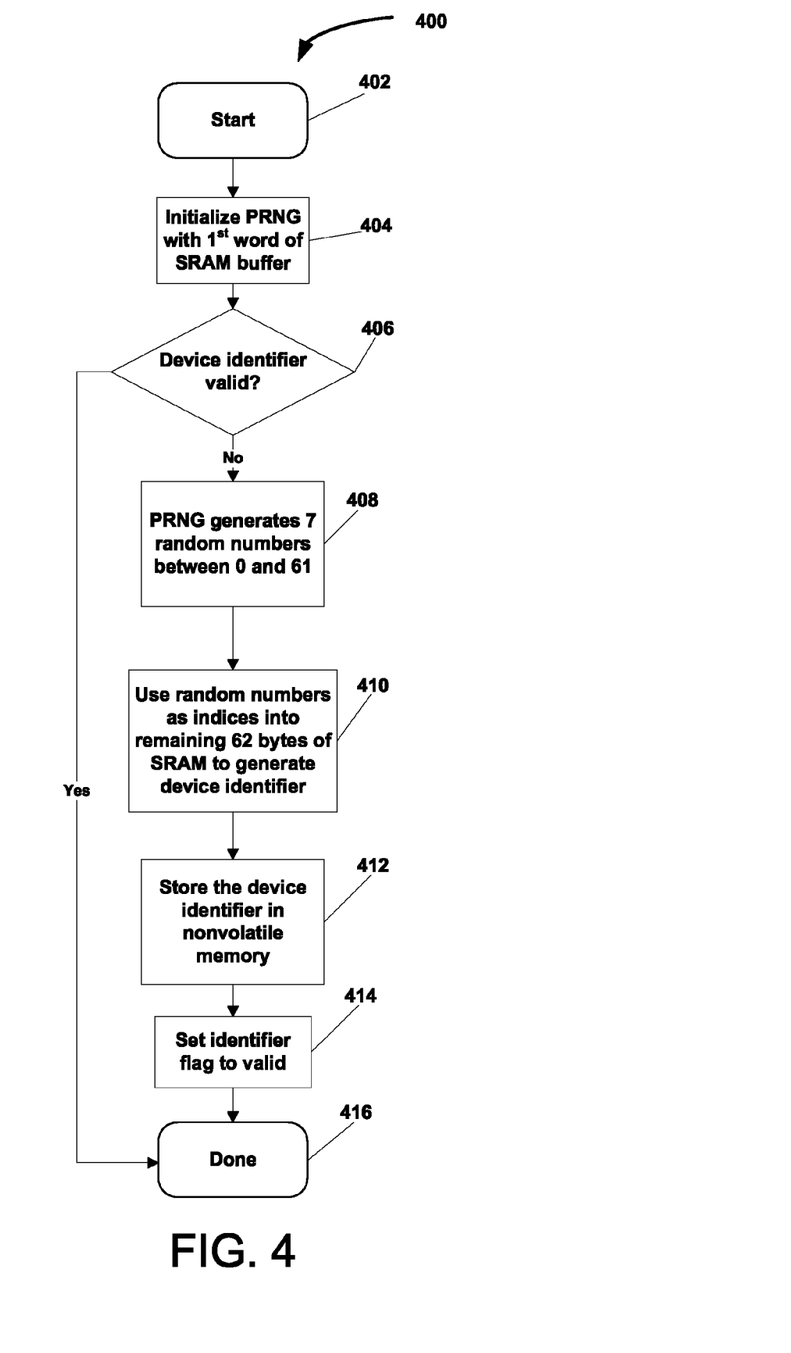
FIG. 4 is a flow diagram illustrating a process of generating a device identifier for a device with a pseudorandom number generator in accordance with one embodiment.

FIG. 4 illustrates a process 400 for generating and storing a device identifier using a device or a controller that does not include a TRNG according to one embodiment of the present invention. According to some aspects, a device uses a small amount (e.g., 64 bytes) of uninitialized SRAM to create a random number to generate a seed for a PRNG. Process 400 begins at act 402. At act 404, during the boot up process of a device, the PRNG is initialized (e.g., using the srand function of a 'C' runtime library) using data from SRAM to load the PRNG with a random seed. According to some aspects, the data includes the first word of the uninitialized array of SRAM (e.g., the first two bytes: byte[0] and byte[1]). According to some examples, the PRNG is initialized as soon as possible so that a manual generation of the device identifier is possible via a user command According to some aspects, the SRAM array may have a total of 64 bytes.

At act 406, a device identifier flag in the nonvolatile memory is checked to find whether or not a valid device identifier has been set. If the device already includes a valid device identifier, process 400 ends. If there is an invalid device identifier or no device identifier, at act 408, the device utilizes the PRNG to generate seven random numbers between 0 and 61 (e.g., using the rand function of a 'C' runtime library). At act 410, the seven random numbers are used as indices into the remaining 62 bytes of the SRAM array. The device identifier is set using the seven random numbers and, at act 412, the device identifier is stored in nonvolatile memory. At act 414, the identifier flag in the nonvolatile memory is set to true to indicate that a valid device identifier has been set for the device. At act 416, process 400 ends.

As described above, in embodiments of the invention, a different process occurs to create a device identifier for a device depending on whether the device has a TRNG or a PRNG. In one embodiment, prior to either process 300 or 400 occurring, a device may be configured to determine whether the device contains a TRNG or a PRNG and then proceed with process 300 or 400 based on the outcome of the determination.

In embodiments discussed above, an SRAM upon initialization is used with a PRNG to generate a device identifier. In other embodiments the SRAM state may be used to directly create a device identifier and/or address.

The processes disclosed herein each include one particular sequence of acts in a particular example. The acts included in processes may be performed by, or using, one or more constrained computing devices specially configured as discussed herein. Some acts are optional and, as such, may be omitted in accord with one or more embodiments. Additionally, the order of acts can be altered, or other acts can be added, without departing from the scope of the systems and methods discussed herein. In addition, as discussed above, in at least one embodiment, the acts are performed on a particular, specially configured machine, namely a constrained computing device configured according to the examples disclosed herein.

State Machine Diagram

Figure 5:
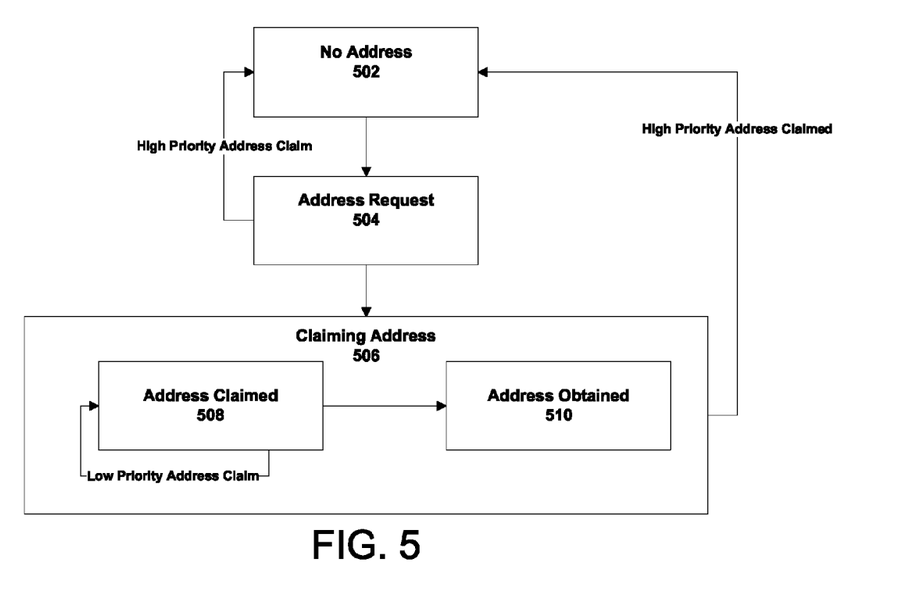
FIG. 5 is an example state machine for device address validation and claiming in accordance with at least one embodiment.

FIG. 5 illustrates a state machine that may be implemented in one of the devices 104 described above to negotiate with other devices for an address. Each device may negotiate using an instance of this state machine. At block 502, the device has not claimed an address. At block 504, an address is requested by the device. The address may be automatically generated using a protocol stack by the device depending on the type of network being implemented. In some examples, the device address is generated using a byte of the device identifier. At block 506, the device runs an address claiming module that arbitrates whether or not an address is unique and should be issued. At block 508, the device may attempt to claim the address. If the device receives an Address Claimed message from second device within a time frame (e.g., 250 ms), then the device compares the device's identifier with the second device's identifier. The system may compare the device's identifier byte by byte to the second device's identifier. If the device attempting to claim the address has a device identifier that is less than the other device's device identifier, the Address Claimed message turns into a "High Priority Address Claim Message." If a "High Priority Address Claim" message is received, the device cannot claim the address and must generate and attempt to use a different address. According to some examples, if the device's device identifier is higher than the second device's device identifier, the Address Claimed message turns into a "Low Priority Address Claim" message. Upon receipt of the "Low Priority Address Claim" message, the device may send a "High Priority Address Claim" message to the device that currently has the address. The device that currently has the address would receive the message, release the address to the first device, and request a new address.

According to some examples, if the device does not receive any message from another device within a predetermined time frame, the system assumes that no other device uses the same address and, at block 510, the system successfully assigns the address to the device. Further, if two or more other devices send an Address Claimed message, then the address will be given to whichever device has the greatest device identifier. According to some examples, once a network address is set on the device, the device may communicate on the network.

The processes above generally describe a network identifier that may be used in an arbitration process. In other embodiments, the network identifier may be a network address or may be used in another manner to generate a network address.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the scope of the examples discussed herein. Accordingly, the foregoing description and drawings are by way of example only.

What is claimed is:

1. A device comprising:
   a network interface;

a memory including random access memory (RAM) and nonvolatile memory; and at least one processor coupled to the nonvolatile memory, coupled to the RAM, and coupled to the network interface, the at least one processor configured to:

designate an uninitialized section of RAM;

generate a network device identifier for the device using data from the uninitialized section of RAM;

store the network device identifier in a nonvolatile memory;

assign the network device identifier to the device;

generate a device address for the device;

receive an indication if a second device has been assigned the device address;

compare the device identifier to a second device identifier assigned to the second device in response to the received indication;

determine a relative priority between the device and the second device in response to the comparison; and assign the device address to one of the device and the second device in response to the determination of relative priority.

2. The device according to claim 1, wherein the at least one processor is further configured to set a device identifier flag in response to assigning the network device identifier to the device.

3. The device according to claim 1, wherein the at least one processor is further configured to generate the network device identifier using the data from the uninitialized section of RAM as a seed for a pseudorandom number generator.

4. The device according to claim 3, wherein an output of the pseudorandom number generator is used as an index to a second uninitialized section of RAM, and at least a portion of the second uninitialized section of RAM is used to generate the network device identifier.

5. The device according to claim 1, wherein the at least one processor is further configured to generate the network device identifier using a true random number generator.

6. The device according to claim 1, wherein the network interface is configured to couple to a controller area network.

7. The device according to claim 1, wherein the nonvolatile memory is electrically erasable programmable read-only memory.

8. The device according to claim 1, wherein the RAM is static random access memory.

9. A method for generating a device identifier, the method comprising:

designating a section of uninitialized random access memory (RAM);

generating the device identifier for a device on a network using data from the section of uninitialized RAM;

storing the device identifier in a nonvolatile memory;

assigning the device identifier to the device;

generating a device address for the device;

receiving an indication if a second device has been assigned the device address;

comparing the device identifier to a second device identifier assigned to the second device in response to receiving the indication;

determining a relative priority between the device and the second device in response to comparing; and assigning the device address to one of the device and the second device in response to determining the relative priority.

10. The method according to claim 9, further comprising setting a device identifier flag in response to assigning the device identifier to the device.

11. The method according to claim 9, wherein generating the device identifier includes generating the device identifier using the data as a seed for a pseudorandom number generator.

12. The method according to claim 11, wherein generating the device identifier further includes using an output of the pseudorandom number as an index to a second uninitialized section of RAM, and using at least a portion of the second uninitialized section of RAM to generate the device identifier.

13. The method according to claim 9, wherein generating the device identifier includes generating the device identifier using a true random number generator.

14. The method according to claim 9, wherein storing the device identifier in the nonvolatile memory includes storing the device identifier in electrically erasable programmable read-only memory.

15. The method according to claim 9, wherein generating the device identifier for the device on the network includes generating the device identifier for the device on a controller area network.

16. The method according to claim 9, wherein designating the section of RAM includes designating a section of static random access memory.

17. A non-transitory computer readable medium having stored thereon sequences of instruction for generating a device identifier, the sequences of instructions including instructions that will cause at least one processor to:

designate a section of uninitialized random access memory (RAM);

generate the device identifier for a device on a network, wherein the device identifier is generated using data from the section of uninitialized RAM;

store the device identifier in a nonvolatile memory; and assign the device identifier to the device;

generate a device address for the device;

receive an indication if a second device has been assigned the device address;

compare the device identifier to a second device identifier assigned to the second device in response to the received indication;

determine a relative priority between the device and the second device in response to the comparison; and assign the device address to one of the device and the second device in response to the determination of relative priority.

18. The non-transitory computer readable medium according to claim 17, wherein the sequences of instruction include further instructions that will cause the at least one processor to set a device identifier flag in response to assigning the device identifier to the device.

19. The non-transitory computer readable medium according to claim 17, wherein the sequences of instruction include further instructions that will cause the at least one processor to use the data from the section of uninitialized RAM as a seed for a pseudorandom number generator.

20. The non-transitory computer readable medium according to claim 19, wherein an output of the pseudorandom number generator is used as an index to a second uninitialized section of RAM, and at least a portion of the second uninitialized section of RAM is used to generate the device identifier.

* * * * *